May 19, 1970 — R. MANCINI — 3,512,233
METHOD OF ASSEMBLING ELECTRO-MAGNETIC DEFLECTION APPARATUS
Filed July 3, 1967
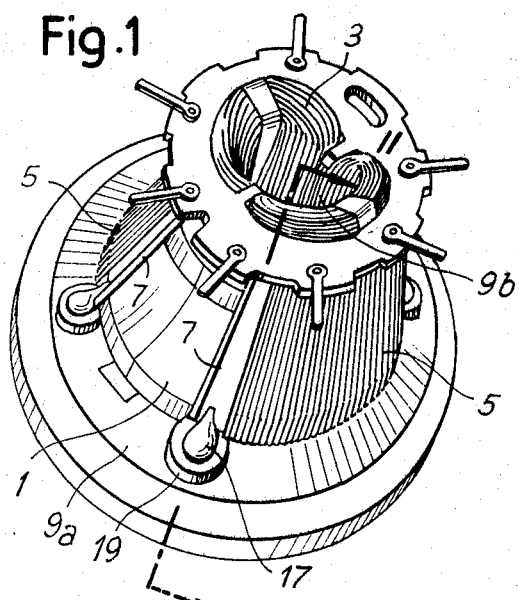
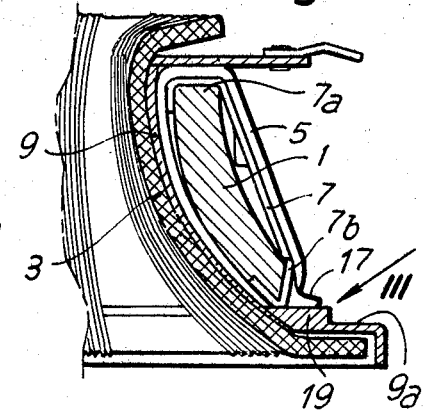
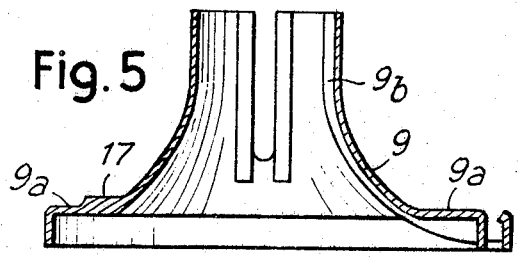
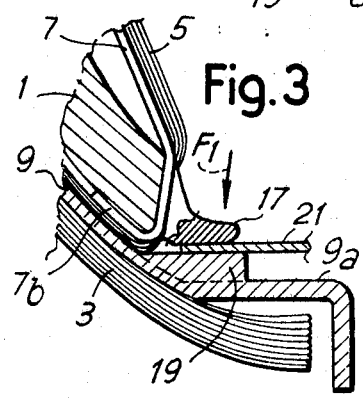
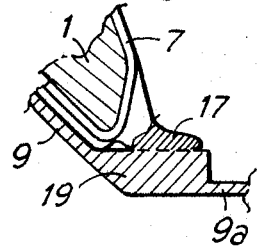
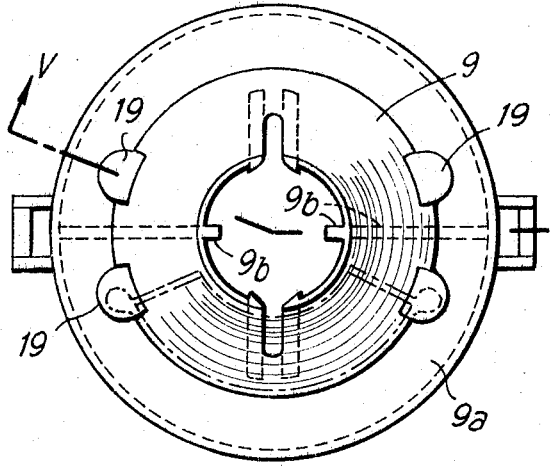
INVENTOR
ROBERTO MANCINI May 19, 1970 R. MANCINI 3,512,233
METHOD OF ASSEMBLING ELECTRO-MAGNETIC DEFLECTION APPARATUS
Filed July 3, 1967 3 Sheets-Sheet 2
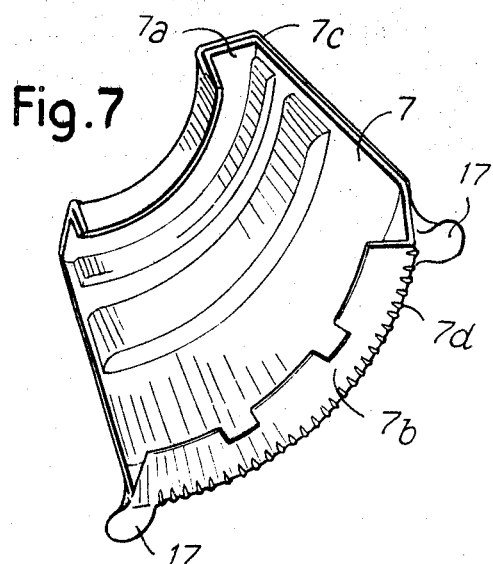
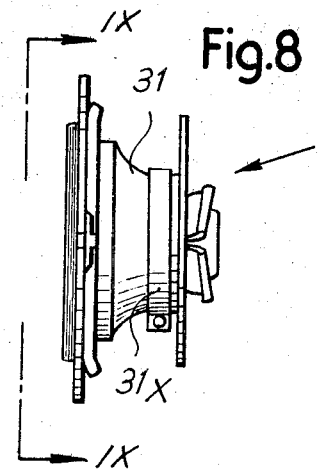
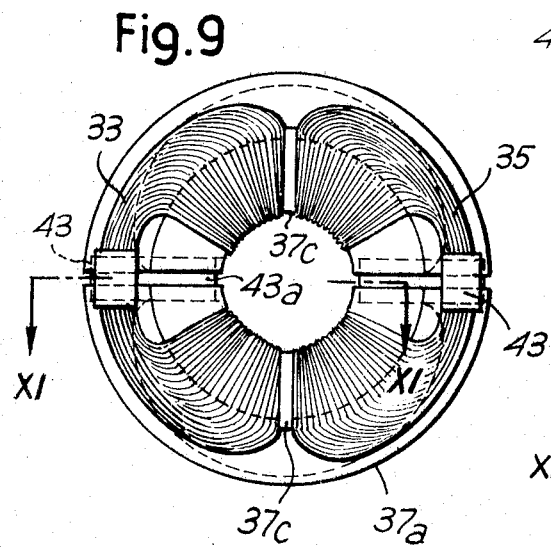
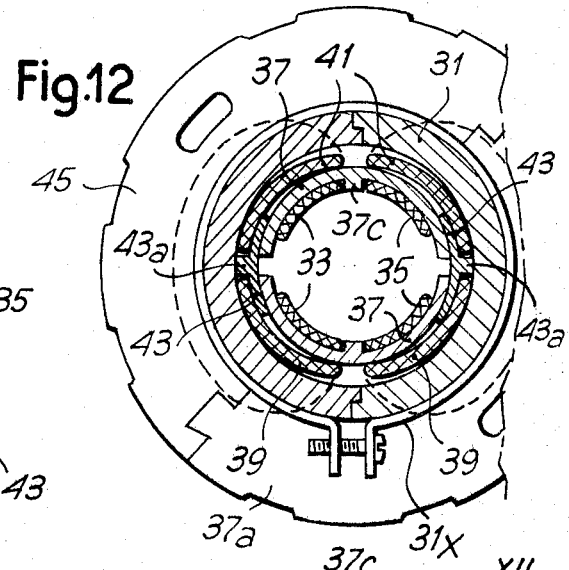
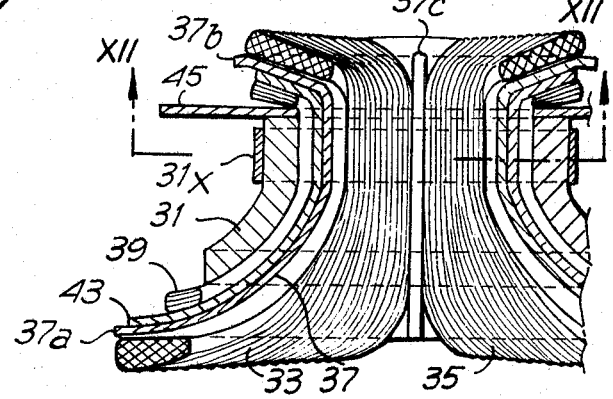
INVENTOR
ROBERTO MANCINI May 19, 1970  R. MANCINI  3,512,233
METHOD OF ASSEMBLING ELECTRO-MAGNETIC DEFLECTION APPARATUS
Filed July 3, 1967  3 Sheets-Sheet 3
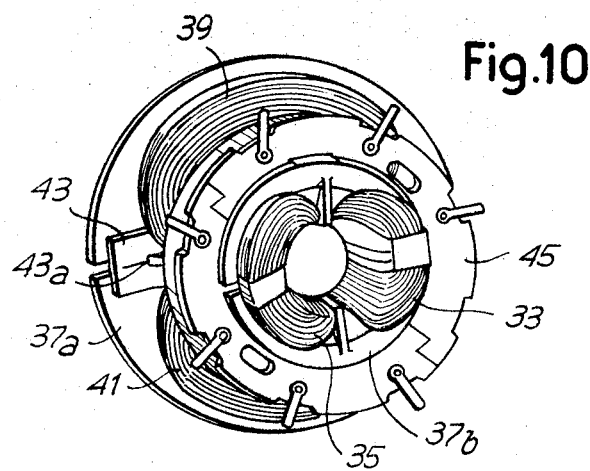
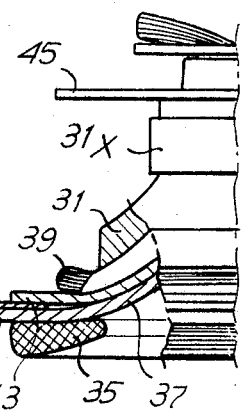
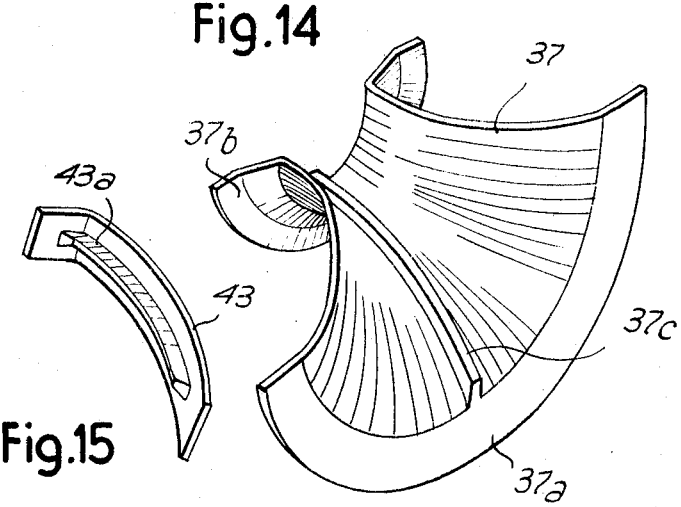
INVENTOR
ROBERTO MANCINI United States Patent Office 3,512,233
Patented May 19, 1970

3,512,233
METHOD OF ASSEMBLING ELECTRO-MAGNETIC DEFLECTION APPARATUS
Roberto Mancini, Florence, Italy, assignor to ARCO Società per l'Industria Elettrotecnica S.p.A., Florence Italy, an Italian corporate body
Filed July 3, 1967, Ser. No. 651,021
Claims priority, application Italy, July 6, 1966, 15,729/66
Int. Cl. H01j 9/18
U.S. Cl. 29—25.13                   4 Claims

ABSTRACT OF THE DISCLOSURE

A method of assembling two sets of electro-magnetic deflection coils for a cathode ray tube relative to one another by the steps of mounting each set of coils on a thermo-plastic former, adjusting the formers relative to one another and thereafter welding complementary contacting surfaces of the formers together.

The present invention relates to electro-magnetic deflection apparatus for a cathode ray tube and methods of assembling the same.

The present invention provides a method of assembling electro-magnetic deflection apparatus for a cathode ray tube comprising the steps of mounting a first coil on a first thermo-plastic former, mounting a second coil on a second thermo-plastic former, adjusting said first and second formers with respect to one another so that said coils take up a predetermined position relative to one another, and welding together two adjacent surfaces of said thermo-plastic formers whereby to lock said coils in said predetermined relative position.

The present invention further provides electro-magnetic deflection apparatus for a cathode ray tube including, an annular ferro-magnetic core, a first thermo-plastic former on which a first coil is mounted, a second thermo-plastic former on which a second coil is mounted, said first and second formers being mounted on said core, said first and second formers having complementary contacting surfaces fused together to hold each said coil relative to one another in a predetermined relationship.

Electro-magnetic deflection apparatus embodying the invention will now be described by way of example, with reference to the accompanying diagrammatic drawings in which;

FIG. 1 is a perspective view of one embodiment of electro-magnetic deflection apparatus;

FIG. 2 shows a fragmentary section on the line II—II of FIG. 1;

FIG. 3 shows a detail to an enlarged scale of FIG. 2 during welding;

FIG. 4 shows a detail to an enlarged scale of FIG. 2 after welding;

FIG. 5 is a section of the former for one set of deflection coils on the line V—V of FIG. 6;

FIG. 6 shows a plan view of the former of FIG. 5;

FIG. 7 is a perspective view of an element of a former of a second set of deflection coils;

FIG. 8 shows a side view of a modified form of electro-magnetic deflection apparatus;

FIG. 9 shows a plan view of the apparatus of FIG. 8;

FIG. 10 shows a perspective view of the apparatus of FIGS. 8 and 9;

FIG. 11 is a fragmentary section along the line XI—XI of FIG. 9;

FIG. 12 is a fragmentary section on the line XII—XII of FIG. 11;

FIG. 13 is a fragmentary partially sectioned detail of the FIG. 11; and

FIGS. 14 and 15 are perspective views of formers for different sets of deflection coils.

FIGS. 1 to 7 show one embodiment of electro-magnetic deflection apparatus in which a pair of saddle-shaped deflection coils 3 and a pair of toroidally shaped deflection coils 5 are mounted with respect to a substantially frusto-conically shaped annular magnetic core 1. Two formers 7 of thermo-plastic material are mounted on opposite sides of the core 1 so as partially to surround the magnetic core 1 as shown in FIG. 2. Each former 7 has a portion 7a which extends over the top of the extreme upper circumference of the core 1 and a portion 7b which extends under the base of the extreme lower circumference of the core.

Each former, as shown in FIG. 7 has two shoulders 7c on the upper circumference and several serrated shoulders 7d on the lower circumference. These shoulders 7c and 7d assist in locating the coil to be wound on the former and in preventing, when the coils are wound thereon, relative movement between each coil and its corresponding former 7.

An inner former 9 of frusto-conical shape and made of thermo-plastic material, houses the deflection coils 3. The inner former 9 has two diammetrically opposite internal axial shoulders 9b which separate the two deflection coils 3 and can be usefully employed in the accurate location of the two coils relative to each other during mounting.

The inner former lies within the toroidally wound core so that just before the assembly of the deflection apparatus is completed relative movement between the two formers 7 and 9 is possible to enable accurate relative alignment between the two pairs of coils.

The inner former 9 has an annular flange 9a around the base thereof on which are disposed at intervals four shoulders 19. The base of each former 7 has two heels 17 disposed at the ends thereof which correspond to two of the shoulders 19 of the inner former 9 and lie in alignment therewith when the two pairs of coils lie approximately in alignment. After the two pairs of coils have been accurately aligned relative to one another the two formers can be interlocked by welding each heel 17 of the former 7 to a corresponding shoulder 19 of the former 9. The welding step can be carried out as shown in FIG. 3 where a heated blade 21 of a welding tool is placed between the shoulder 19 and the heel 17 to plastify the opposing surfaces so that on removal of the blade 21 a pressure applied in the direction of the arrow $F_1$ in FIG. 3 on the heel 17 will cause the members to be welded together almost instantaneously.

In the modified form of the electro-magnetic deflection apparatus as shown in FIGS. 9 to 15, two pairs of saddle-shaped coils are used both of which are housed within a substantially frusto-conical annular magnetic core 31. The pairs of coils 39, 41 are mounted on the inside of the magnetic core 31 and separated from each other by two diametrically opposite curved thermo-plastic formers of T section as shown in FIGS. 12 and 15. Inwardly of the pair of coils 39, 41 lies a frusto-conical thermo-plastic former formed from two separate sections 37. Each section has an internal axial ridge 37c which separates the two coils 33 and 35 mounted therein. Here again the two pairs of formers 37 and 43 can move relatively to one another to enable accurate relative positioning of the two coils. The base of the former 37 has a flange 37a which at its sides overlap a flange on the base of former 43. After accurate relative positioning of the two pairs of coils, the two formers can be welded together in a similar manner to that described in conjunction with FIG. 3 using the heated blade 47 as shown in FIG. 13.

The core 31 as shown in FIG. 12 can be formed from two semi-circular sections which are held together by a strap and screw assembly 31x.

In previously proposed methods of assembly of electromagnetic deflection apparatus, after relative angular positioning of the coils has been carried out two different forms of adhesive were used to lock the coils relative to one another. A first material such as wax which sets rapidly and has low adhesive strength was used to quickly secure the relative positions of the two coils. At the same time a slow setting adhesive having a high adhesive strength, such as a thermo-plastic resin was used to secure the two coils relative to one another more permanently. A disadvantage of this method lies in the length of time required for the slow setting adhesive to set which renders any mass production of the apparatus inefficient.

I claim:
1. A method of assembling electro-magnetic deflection apparatus for a cathode ray tube comprising the steps of:
   mounting a first coil on a first thermo-plastic former,
   mounting a second coil on a second thermo-plastic former,
   adjusting said first and second formers with respect to one another, to a predetermined relative position, and
   welding together two adjacent surfaces of said thermo-plastic formers.
2. A method according to claim 1 wherein said step of welding comprises the steps of:
   plasticizing said adjacent surfaces, and thereafter
   urging said adjacent surfaces together.
3. A method according to claim 1 including the steps of
   winding said first coil in saddle form, and
   winding said second coil toroidally on said second former.
4. A method according to claim 1 including the steps of:
   winding said first coil in saddle form, and
   winding said second coil in saddle form.

References Cited
UNITED STATES PATENTS

| | | | |
|---|---|---|---|
| 2,852,712 | 9/1958 | Fabel | 335—213 XR |
| 2,901,665 | 8/1959 | Barkow et al. | |
| 3,117,258 | 1/1964 | Allen | 335—213 |
| 3,163,794 | 12/1964 | Bloomsburgh et al. | |
| 3,192,432 | 6/1965 | Nero. | |

CHARLIE T. MOON, Primary Examiner

R. B. LAZARUS, Assistant Examiner

U.S. Cl. X.R.
29—605